R. H. McDONOUGH.
TRANSMISSION LOCK FOR MOTOR VEHICLES.
APPLICATION FILED JULY 30, 1920.
1,405,603.
Patented Feb. 7, 1922.
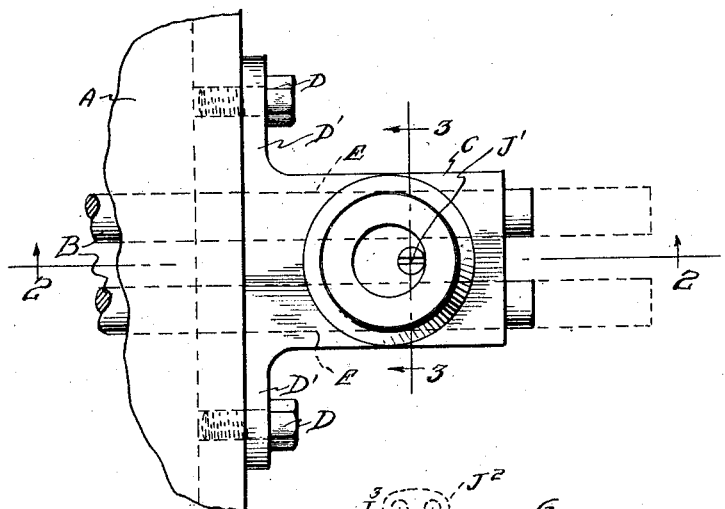
Fig. 1
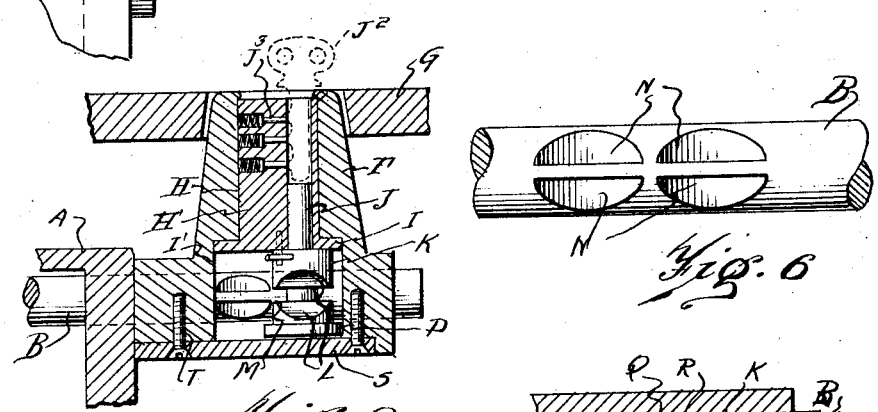
Fig. 2
Fig. 6
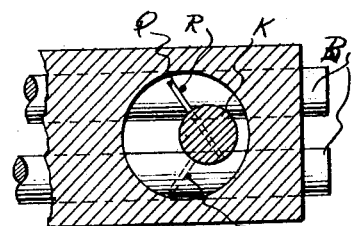
Fig. 5
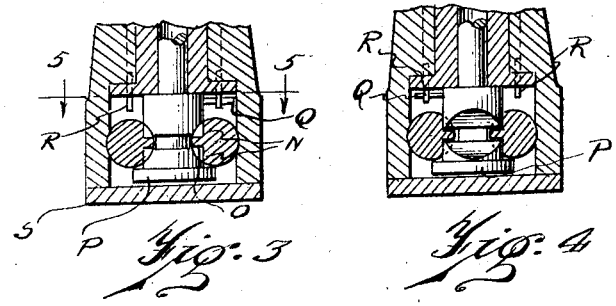
Fig. 3
Fig. 4
Inventor
ROBERT H. McDONOUGH
By Whittemore, Hulbert, and Whittemore
Attorneys

UNITED STATES PATENT OFFICE.

ROBERT H. McDONOUGH, OF DETROIT, MICHIGAN.

TRANSMISSION LOCK FOR MOTOR VEHICLES.

1,405,603. Specification of Letters Patent. Patented Feb. 7, 1922.

Application filed July 30, 1920. Serial No. 400,132.

*To all whom it may concern:*

Be it known that I, ROBERT H. McDONOUGH, a citizen of the United States of America, residing at Detroit, in the county of Wayne and State of Michigan, have invented certain new and useful Improvements in Transmission Locks for Motor Vehicles, of which the following is a specification, reference being had therein to the accompanying drawings.

This invention relates particularly to transmission locks for motor vehicles, although applicable to other purposes.

It is the object of the invention to provide a locking member adapted through rotation to be interlocked with, or disengaged from the sliding gear shift rods, or other controlling elements of a motor vehicle transmission.

While the invention as hereinafter disclosed is applied as a common locking means to control two rods of the sliding type, it will be readily understood that a single control rod of such type may be equally well controlled or either one or two rods of a rotary type.

The invention consists in the structural features and arrangement of parts presently to be described and illustrated in the accompanying drawing, wherein:

Figure 1 is a plan view showing the lock mounted upon a transmission casing and engaging a pair of control rods adjacently projecting from said casing;

Figure 2 is an axial vertical sectional view thereof, the section being taken upon line 2—2 of Figure 1;

Figure 3 is a transverse vertical section taken on line 3—3 of Figure 1 and showing the unlocked position of the parts;

Figure 4 is a similar view showing the parts locked;

Figure 5 is a horizontal section taken on line 5—5 of Figure 3.

Figure 6 is a fragmentary side view of one of said sliding control rods for the transmission.

In these views the reference character A designates a motor vehicle transmission casing having a pair of parallel adjacent sliding control rods B projecting therefrom. The projecting portions of said rods are engaged by a lock casing C secured to the transmission casing by tap screws D engaging lugs D' upon one end of the casing C. At E are indicated the bores of casing C through which the rods B are extended. The casing C has formed thereon an upstanding boss F of a height adapting it to project into an opening of the motor vehicle platform G, terminating substantially flush with the top face of said platform. Said boss is centrally bored as indicated at H to receive a cylindrical element H' of a pin and cylinder type of lock, said element having an annular flange I upon its lower extremity engaging in a counterbore I' formed partially in said boss and in the main body of the casing C. A rotatable stem J for the lock is mounted in the cylinder H' parallel to the axis thereof, but in an eccentric relation to the cylinder, the upper portion of said stem being slotted vertically as indicated at J' for engagement by an ordinary type of key such as indicated in dash lines in Figure 2 at J². Spring pressed pins J³ are mounted horizontally in the cylinder H' and are adapted to project into the slot J' of the stem J to restrain the latter from rotation, as is common in locks of this type. Below the cylinder H' and within the counterbore I', the stem J carries a cylindrical locking head K, the diameter of which is greater than the space interval between the rods B, said head being segmentally notched at opposed sides thereof as indicated at L, adapting it to engage between the rods B, as is best seen in Figures 3 and 4, the notches L snugly embracing said rods. The head K is formed with an annular groove M which is substantially in the common axial plane of the rods B and which consequently centrally cuts the notches L dividing the latter into upper and lower portions, as is best seen in Figure 2. Upon the opposed faces of the rods B, that is to say the faces adjacent the head K, said rods are segmentally notched as indicated at N above and below a rib O, which rib registers vertically with the annular groove M, said notches N conforming to the curvature of the head K and being adapted to snugly receive portions of said head in a certain position of rotation of the latter, in which position the ribs O engage in the groove M. Preferably there is provided two sets of said notches N and ribs O in each of the rods B, which sets respectively register with the head K in the respective positions of sliding adjustment of said rods. Beneath the rods B, the head K is formed with an annular flange P which eliminates any possibility of the locking head being upwardly removed from engagement with the rods B in case the boss F is broken from the casing in an attempt to gain unauthorized access to the lock. Rotation of the stem J and head K is limited to substantially a quarter turn by the provision upon said head of a radially projecting pin Q engageable in the desired limiting positions of the head with a pair of pins R carried by the flange I and depending therefrom within the counterbore I'. Preferably said pins also project sufficiently upward from said flange to engage in the boss F, restraining the cylinder H' from rotation and establishing a fixed position of the cylinder with respect to the boss, in which position, the axis of the stem J passes midway between the rods B so that said rods will be equally engaged by the locking member K. S is a cover member for the counterbore I' engaging the bottom face of the casing C and secured to said casing by screws T.

Considering now the operation of the described mechanism, when the lock is not applied to prevent shifting of the rods B, the locking head occupies the position illustrated in Figures 2, 3 and 5, the notches L registering with the rods B and consequently permitting the latter to slide freely in either direction. Locking of said rods is accomplished by turning said locking head through 90° by engagement of an ordinary key $J^2$ with the stem J. When so turned cylindrical portions of the locking head K engage in the notches N of both rods B and the ribs O of said rods are engaged within opposed portions of the annular groove M, this position of the parts being clearly shown in Figure 4. Under such conditions it is evident that the control rods are positively restrained against any sliding movement. The two described positions of the locking head K are determined by engagement of the pin Q with the respective depending pins R. Since in each limiting position of each control rod B, a set of the notches L and rib O is registered with the locking head K it is apparent that locking of the two rods may be effected when they are in either of their corresponding limiting positions, or if desired, when they are in reverse limiting positions. The drawings indicate in full lines one of the limiting positions of the rods B and the other limiting position is indicated in dash lines in Figure 1.

In the illustrated application of the invention, it is necessary only to restrain the rods B against reciprocation to properly lock said rods. It is to be observed however, that the locking mechanism is of a type which is adapted to prevent rotation as well as reciprocation of an engaged rod or shaft, since when the lock is applied, the longitudinal ribs O of the rods are engaged in the annular groove M of the locking head. The invention therefore is applicable to lock transmissions of a well known type in which a rotative shaft or rod constitutes the controlling element rather than the slide rods referred to in the preceding description. Also the invention may be employed to advantage to effect locking of any shaft or rod to prevent both reciprocating or rotative movement thereof.

What I claim as my invention is:

1. A lock, comprising a rod or shaft transversely formed with a segmental notch and longitudinally ribbed centrally of said notch, of a locking member rotatable transversely of said rod or shaft provided with an annular groove registrable with said rib and projecting into a notch of said rod or shaft in one position of rotation, in which position said rib is engaged in the groove of said locking member.

2. A lock, comprising a rod or shaft transversely formed with a segmental notch and a longitudinal rib centrally traversing said notch, and a locking member for said rod or shaft rotative adjacent thereto and segmentally notched to normally accommodate said rod or shaft without affecting movement thereof, said locking member having an annular groove in the plane of said rib and engaging the rib in the groove in one position of rotation in which position a portion of the locking member is embraced within the notch of said rod or shaft and restrains the latter from movement.

3. A lock comprising a pair of spaced parallel rods or shafts transversely formed upon opposed faces with segmental notches and longitudinally ribbed centrally of said notches, of a locking member interposed between said rods and rotatable transversely thereof, said member having an annular groove registrable with said ribs and projecting into said notches of said rod in one position of rotation, in which position said ribs engage in the groove of said locking member.

4. A lock comprising a pair of rods or shafts extending in parallel spaced relation and respectively formed upon opposed faces with segmental notches and with longitudinal ribs traversing said notches and a locking member interposed between said rods and rotative transversely thereof, segmentally notched to normally accommodate said rods without effecting movement thereof, said locking member having an annular groove in the plane of said ribs and engaging said ribs in said groove in one position of rotation, in which position a portion of the locking member is embraced within the notches of said rods restraining the latter from movement.

5. In a lock, the combination with two parallel adjacent rods or shafts having registerable transverse notches, of a common locking member for said rods or shafts transversely engaging between the same and projecting into the notches thereof in one position of rotation of said locking member to restrain said rods or shafts from movement, said locking member being formed with an annular flange engageable with said rods or shafts to resist longitudinal movement of the locking member.

In testimony whereof I affix my signature.

ROBERT H. McDONOUGH.